C. E. FERCIOT.
HORSE OVERSHOE.
APPLICATION FILED JAN. 2, 1914.
1,110,317.
Patented Sept. 15, 1914.
2 SHEETS—SHEET 1.
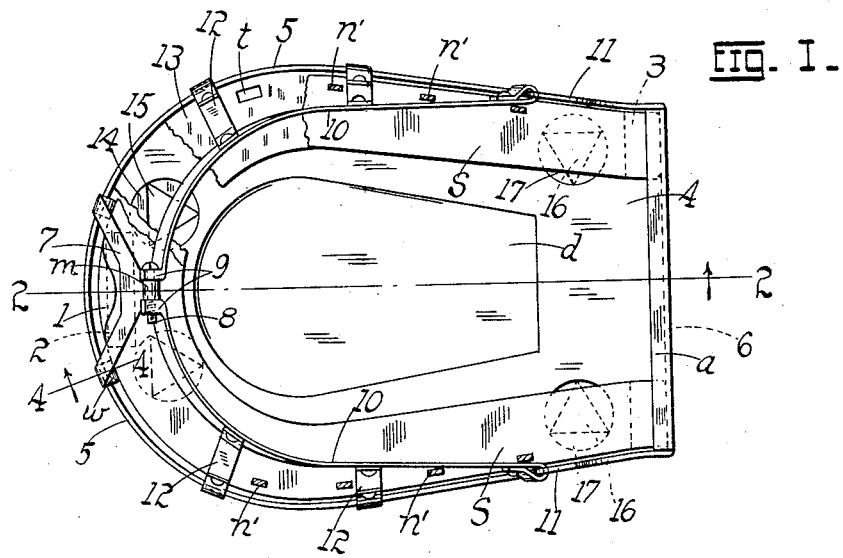
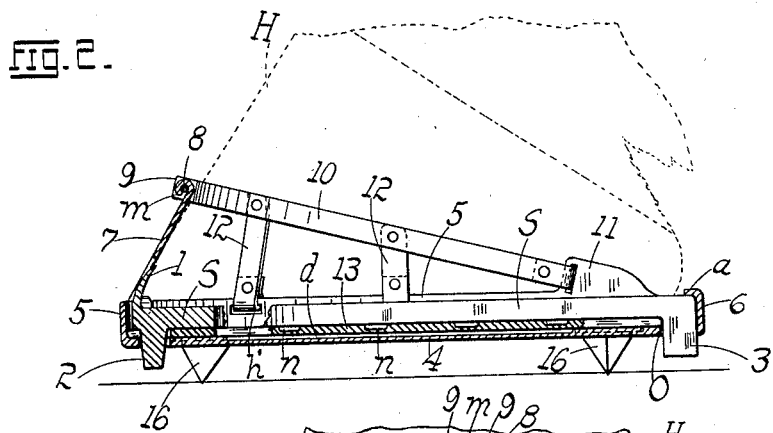
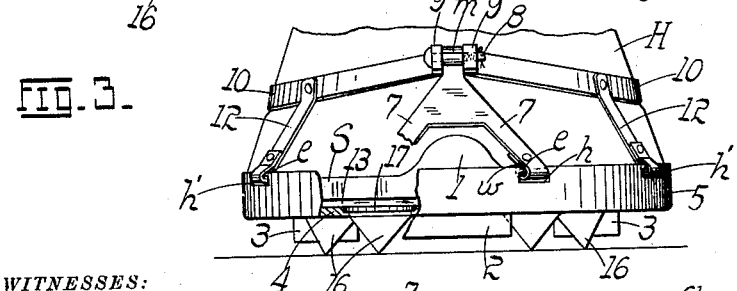
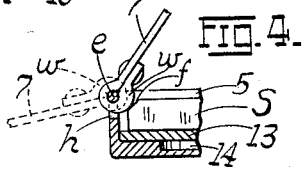
WITNESSES:
INVENTOR.
Charles E. Ferciot.
BY
ATTORNEY.
THE NORRIS PETERS CO., PHOTO-LITHO., WASHINGTON, D. C.

C. E. FERCIOT.
HORSE OVERSHOE.
APPLICATION FILED JAN. 2, 1914.
1,110,317.
Patented Sept. 15, 1914.
2 SHEETS—SHEET 2.
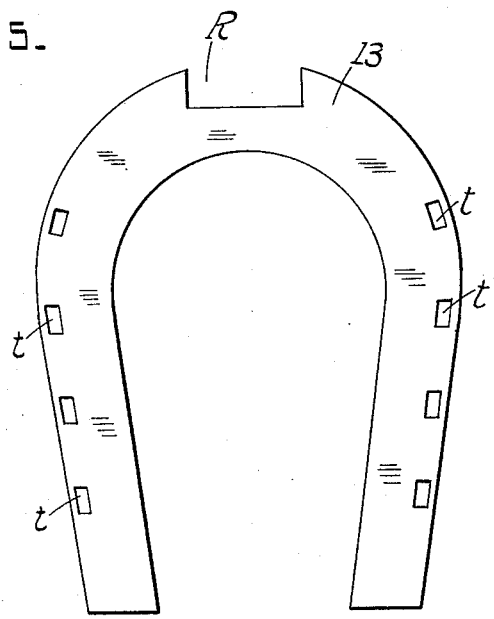
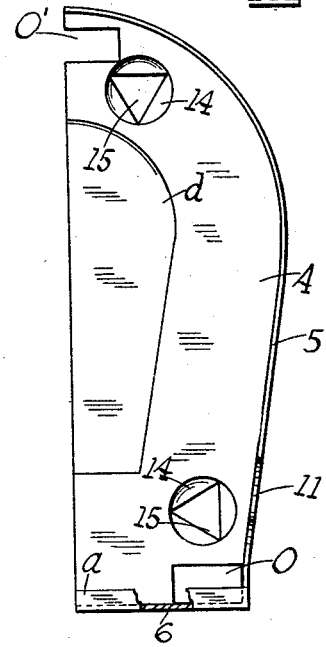
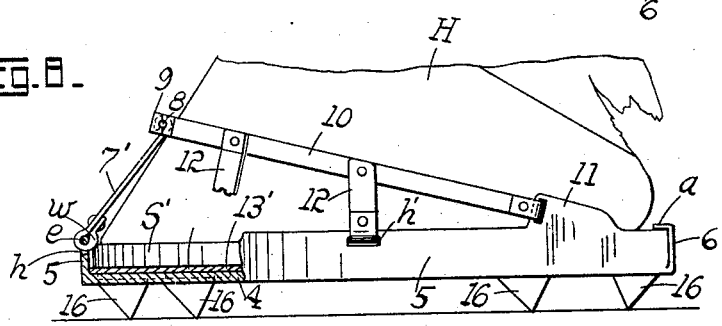
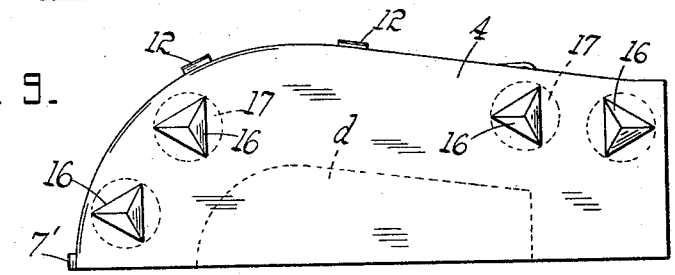
WITNESSES:
Harry A. Bennes
Jos. A. Michel
INVENTOR.
Charles E. Ferciot.
BY
ATTORNEY.

UNITED STATES PATENT OFFICE.

CHARLES E. FERCIOT, OF ST. LOUIS, MISSOURI.

HORSE-OVERSHOE.

1,110,317.     Specification of Letters Patent.     Patented Sept. 15, 1914.

Application filed January 2, 1914. Serial No. 809,928.

*To all whom it may concern:*

Be it known that I, CHARLES E. FERCIOT, a citizen of the United States, residing at St. Louis, State of Missouri, have invented certain new and useful Improvements in Horse-Overshoes, of which the following is a full, clear, and exact description, reference being had to the accompanying drawings, forming a part hereof.

My invention has relation to improvements in horse over-shoes; and it consists in the novel features of construction more fully set forth in the specification and pointed out in the claims.

In the drawings, Figure 1 is a top plan of a horse-shoe with the over-shoe passed thereover, the hoof of the animal being omitted; Fig. 2 is a vertical longitudinal section thereof on the line 2—2 of Fig. 1, the hoof being shown dotted; Fig. 3 is a front elevation of the hoof and over-shoe, parts being broken to show the horse-shoe; Fig. 4 is a sectional detail on the line 4—4 of Fig. 1; Fig. 5 is a top plan of the filler-piece or member; Fig. 6 is a top plan of one-half of the over-shoe, the securing band and links being omitted; Fig. 7 is a side elevation of one of the removable calks of the over-shoe, detached; Fig. 8 is a side elevation of a modification of over-shoe when used in conjunction with a calkless horse-shoe; and Fig. 9 is a bottom plan of one-half of the over-shoe shown in Fig. 8.

The object of my invention is to construct a horse over-shoe the calks of which are removable to permit the renewing thereof whenever made necessary through excessive wear, thus always furnishing the animal with a perfectly level support; one which dispenses with the necessity of frequent shoeing; one which secures a firm purchase on the ground thereby preventing slipping; one affording a cover for the entire bottom of the hoof thereby excluding foreign matter from contact with the hoof; and one possessing further and other advantages better apparent from a detailed description of the invention which is as follows:

Referring to the drawings, and for the present to Figs. 1 to 7 inclusive, H represents (shown dotted in Fig. 2) the hoof of the animal, and S the customary horse-shoe provided with a toe-piece 1, a toe-calk 2, and heel-calks 3. The overshoe consists of a body portion or platform 4 thinner at the center so as to leave a central depression $d$ (and thereby lighten the weight of the shoe) the margin of the platform being provided with an up-turned (preferably continuous) flange or rim 5 surrounding the sides and front of the member 4, the latter being provided with a rear wall 6 serving as an abutment for the terminals of the shoe S. The wall 6 may run across the entire distance between the sides of the platform 4, as shown, through a removal of the central portion thereof, or that between the inner edges of the rear ends of the shoe S when the latter is deposited on the platform would not constitute a departure from the spirit of my invention. The wall 6 terminates at the top in an inwardly turned lip or flange $a$ for engaging the upper face of the shoe S.

The platform 4 is provided at the rear corners thereof and at the base of the wall 6, with openings O for the reception of the heel-calks 3, the latter having a slight forward and backward play in said openings so as to permit the shoe S to be driven firmly against the wall or abutment 6 and well under the lip or flange $a$. Formed in the flange 5 on each side of the center at the front of the over-shoe are slots or openings $h$, the upper bounding walls of said openings being rounded so as to leave cylindrical portions $e$ which serve as hinge-pins for the diverging arms of a swinging yoke or anchor 7, the arms of the yoke straddling the toe-piece 1 of the inner shoe S. The free end of the yoke terminates in an outwardly turned hook or open loop $m$ adapted to hook over the stem of a screw 8 passed through the interiorly screw-threaded lugs 9, 9, forming the front terminals of the hoof-bands 10, 10, the rear ends of the bands being secured to the lugs or lobes 11, 11, formed along the rear portions of the upper edges of the flange 5. Between the members 11 and 9, the respective bands 10 are connected to the flange 5 by a series of links 12 looped through the slits $h'$ of the flange 5, and decreasing progressively in length toward the rear of the shoe so that the bands when coupled together by the screw 8 may slope rearward and downward to conform to the configuration of the front and sides of the hoof H. The heads $n$ of the horse-shoe nails $n'$, which usually project beyond the bottom face of the shoe S, are in the present instance received by suitable depressions $t$ of a filler or pad 13 of leather or equivalent material interposed between the platform 4 and shoe S, the said filler serving as a protecting shield for the soft under parts of the hoof. The filler is not necessarily indispensable, but where used, it is provided with a front recess R registering with the opening O' in the platform 4 for the passage therethrough of the toe-calk 2 of the shoe S. The filler 13 is of a shape substantially that of the shoe S as fully indicated in Fig. 5. Disposed at convenient points on the platform 4 are (preferably) circular depressions 14 the bases of which are provided with (preferably) triangular openings 15 for the reception of the detachable calks 16 of the over-shoe, the upper end of the calk being provided with a circular head or disk 17 adapted to be received by the depression 14, and when once inserted the upper face of the disk 17 is flush with the corresponding face of the platform 4 (Fig. 3). The height of the calks 16 (which by the way are case-hardened) is such as to lift the calks 2, 3, off the ground so that the animal walks on calks which are readily renewable and thus always fresh, and slipping of the animal is practically impossible.

An examination of Fig. 4 shows that the portion of the yoke 7 looped through the slit $h$ has formed thereon a slight cam or equivalent eccentric formation $w$, said cam, with the coupled position of the yoke, engaging an inclined facet $f$ on the shoe S. When the yoke 7 is swung against the hoof H and anchored to the hoof-bands 10 (Figs. 1, 4) the cams $w$ will bear against the facets $f$ and thus force the rear ends of the shoe S well against the abutment 6 and under the flange $a$; or, what amounts to the same thing, the wall 6 of the over-shoe is drawn firmly against the calks 3, and the over-shoe once secured does not slip from its position.

The mode of applying the over-shoe is as follows: Let us assume that the hoof H is provided with the ordinary shoe S. Let us assume too that the calks 16 have been deposited with their heads 17 in the depressions 14, and that the filler 13 has been laid on the platform 4 over the heads 17 of the calks aforesaid. The calks 2, 3, of the shoe S are now passed through the openings R, O', and O, formed for their reception, and, assuming that the yoke 7 is previously swung loose from the hoof-bands 10, to allow the latter to be accommodated to any size hoof, the operator then inserts the screw 8 through the lug 9 of one of the bands, and through the loop $m$ of the yoke, and then drives the screw through the lug 9 of the opposite band 10 thus drawing the bands tightly about the hoof. As previously stated, the anchoring of the yoke 7 to the bands 10 draws (by virtue of the cam $w$) the parts 6 and $a$ against and over the shoe S, and no displacement of the parts can take place. To remove the over-shoe the screw 8 is first unscrewed when the removal readily follows.

Where the overshoe is intended to be worn permanently, the animal may be provided with a calkless inner shoe S' which may also be devoid of the usual toe-piece 1. In such cases the filler 13' need not be recessed, nor need the platform 4 be provided with openings O, O', for the passage of any calks. Such a modification is illustrated in Figs. 8 and 9, and in such cases the number of calks 16 in the platform 4 may be increased over the number in the main form described. In this modification the shoe is constructed the same as that of the first form described, the corresponding parts being identified by the same reference symbols. The "yoke" 7 however, disappears in the modified form and in lieu thereof a centrally pivoted strap 7' is substituted, the yoke arms which straddle the toe-piece 1 in the first form, being no longer necessary. The cam $w$ in the looped end of the strap is the same as in the main form described.

I do not wish of course, to be limited to the precise structural details here shown, as they may in a measure be departed from without affecting the nature or spirit of my invention.

Having described my invention, what I claim is:

1. A horse over-shoe comprising a platform for the support of the shod hoof of the animal, a rim on the platform bounding the front and sides of the inner shoe, abutments at the rear of the platform for engaging the rear ends of the inner-shoe, bands leading from the rear portions of the rim and embracing the hoof and following the contour thereof, means at the free ends of the bands for tightening the same about the hoof, a member hinged to the front of the over-shoe and adapted to be coupled to the bands, said hinged member being provided with a cam formation operating to engage the inner shoe and draw the abutments at the rear end of the over-shoe into firm contact with the corresponding ends of the inner shoe, when said member is secured to the bands.

2. An over-shoe for calked inner shoes comprising a supporting platform provided with openings for the free passage therethrough of the toe and heel calks of the inner shoe, a flange or rim on the platform for engaging the front and sides of the inner shoe, forwardly and upwardly inclined hoof bands leading from the rear of the sides of the rim aforesaid, a coupling and tightening screw for drawing the free ends of the bands together, a member hinged to the front of the rim and adapted to be anchored to the screw aforesaid, a cam formation on said member adjacent to its hinge axis adapted to engage the inner shoe and operating to draw the rear of the over-shoe toward the inner shoe, the platform being provided with a rear wall terminating in an inwardly deflected flange whereby when the hinged member is anchored as aforesaid, the said rear wall and flange hug the terminals and upper faces of the inner shoe and displacement of the over-shoe is prevented.

3. An over-shoe for horses comprising a platform adapted to engage the bottom of the inner shoe and provided with openings to admit the calks of said inner shoe, means for securing the platform to the hoof of the animal, and a hinged front member interposed between the platform and securing means and provided with a cam formation about its hinge axis operating to draw the inner shoe and over-shoe into firm frictional engagement with the swinging of said hinged member inwardly.

4. An over-shoe for horses comprising a platform for supporting the inner shoe and provided with openings for the passage of the toe and heel calks of the inner shoe, a marginal flange and rear wall on the platform for engaging the front, sides, and back of the inner shoe, bands leading from the rear portions of the sides of the flange, forward over the hoof, means for drawing the free ends of the bands together, a flange formed on the rear wall of the platform for engaging the upper face of the inner shoe, and a member hinged in front to the flange and provided with a cam formation at the hinge axis engaging the front of the inner shoe and operating to draw the over-shoe into firm engagement with the inner shoe, with the coupling of the free end of said hinged member to the front ends of the bands aforesaid.

In testimony whereof I affix my signature in presence of two witnesses.

CHARLES E. FERCIOT.

Witnesses:
EMIL STAREK,
JOS. A MICHEL.

Copies of this patent may be obtained for five cents each, by addressing the "Commissioner of Patents, Washington, D. C."